United States Patent [19]

Pochwalski et al.

[11] 4,187,428

[45] Feb. 5, 1980

[54] METHOD AND APPARATUS FOR ABSOLUTE ACTIVITY DETERMINATION OF RADIONUCLIDES

[75] Inventors: Krzysztof K. Pochwalski; Tomasz E. Radoszewski, both of Warsaw, Poland

[73] Assignee: Instytut Badan Jadrowych, Warsaw, Poland

[21] Appl. No.: 906,343

[22] Filed: May 15, 1978

[30] Foreign Application Priority Data

May 17, 1977 [PL] Poland .................................. 198185

[51] Int. Cl.[2] .............................................. G01T 1/20

[52] U.S. Cl. .................................... 250/366; 250/328; 250/369

[58] Field of Search ............... 250/328, 361 R, 363 R, 250/366, 367, 369, 264, 265, 252, 364

[56] References Cited

U.S. PATENT DOCUMENTS

| | | | |
|---|---|---|---|
| 2,830,185 | 4/1958 | Scherbatskoy | 250/264 |
| 3,080,482 | 3/1963 | Scherbatskoy | 250/264 |
| 3,780,289 | 12/1973 | Kulberg et al. | 250/366 X |
| 3,854,047 | 12/1974 | Suhami et al. | 250/366 |

*Primary Examiner*—Davis L. Willis
*Attorney, Agent, or Firm*—Haseltine, Lake & Waters

[57] ABSTRACT

A method and apparatus for absolute activity determination of radionuclides, especially of low maximum energy pure beta-emitters as for instance $^{3}H$, $^{63}Ni$, $^{14}C$, $^{35}S$. The application of the invention can also be extended for activity determinations of other radionuclides, for example of those disintegrating through the electron capture. The method contemplates producing pulses of various multiples of coincidence simultaneously, and correlating the counts of the pulses to obtain a measure of the absolute activity. This is achieved by providing a scintillation head containing at least three photomultipliers optically coupled to the scintillator and the source whose activity is to be measured. The outputs of the photomultipliers are connected via amplifiers to coincidence gates having two and three inputs. The outputs of coincidence gates with two inputs are connected to a summing circuit whose output constitutes the first output of the system, the output of the gate with three inputs constituting the second output of the system.

7 Claims, 1 Drawing Figure

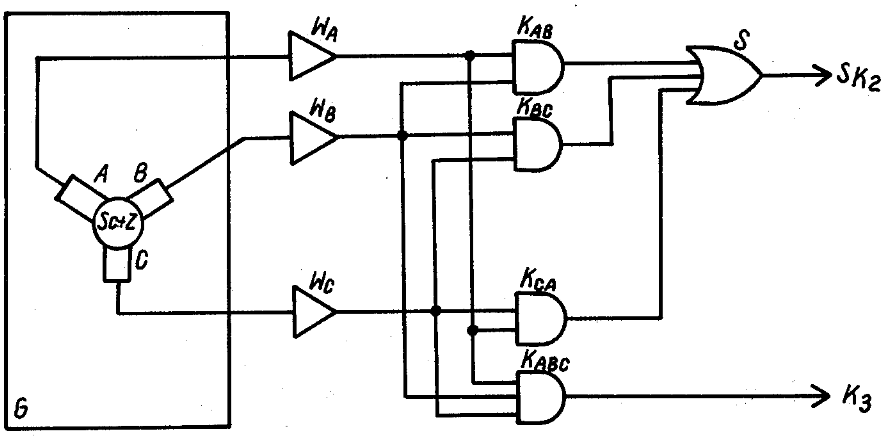
G
A
B
Sc+Z
C
WA
WB
WC
KAB
KBC
KCA
KABC
S
SK2
K3

METHOD AND APPARATUS FOR ABSOLUTE ACTIVITY DETERMINATION OF RADIONUCLIDES

FIELD OF THE INVENTION

The invention relates to a method and apparatus for absolute activity determination of radionuclides, especially of pure low maximum energy beta-emitters such as $^3H$, $^{63}Ni$, $^{14}C$, $^{35}S$.

The application of the invention can be also extended to activity determinations of other radionuclides, for instance those disintegrating over the electron capture.

PRIOR ART

The commonly employed methods for activity determination of radionuclides, specified in the literature, for instance in the book of Donald L. Horrocks, "Application of Liquid Scintillation Counting", Academic Press 1974, consist in relative determination by using standard sources. A number of firms in the world build instruments for activity determination of the beta-radioactive radionuclides based on the method of liquid scintillation counting.

A known apparatus for activity determination of radionuclides consists of a scintillation head, wherein two photomultipliers are optically coupled with one counting vial containing a solution of the radionuclide in a liquid scintillator and of a single system counting the coincident pulses of both photomultipliers. The apparatus contains amplifiers connected by a coincidence gate. Additionally, the apparatus contains an inner calibration source making it possible to determine the actual counting efficiency. The activity determination consisting in counting the pulses produces results lower than the actual number of disintegrations, due to an incomplete conversion of the energy of disintegration into pulses being registered. The counting efficiency can be additionally reduced by the effect of scintillation quenching in the solution by the substance being measured by itself. For each source to be measured, the quenching must be determined each time. The determination of quenching demands the measuring instrument to be calibrated by means of a standard source of the radionuclide. Moreover, measuring each source, an additional calibration measurement by means of an additional gamma-source is necessary.

SUMMARY OF THE INVENTION

The method for absolute activity determination of radionuclides, according to the invention, consists in that simultaneously various multiples of coincidences are employed, whereafter a correlation of counts obtained in various multiples of coincidences is carried out.

The apparatus according to the invention comprises a scintillation head containing at least three photomultipliers, and the system for counting the coincidence pulses has at least two outputs connected with gates having different multiples of coincidences.

The invention enables the determinations of the absolute activity of radionuclides of beta-emitters, especially of emitters having low maximum energy, as well as of other radionuclides, for instance those disintegrating through electron capture.

Owing to employing the correlation of various multiples of coincidence, the absolute determination become possible, eliminating the calibration of the system by means of standard sources. The counting efficiency is determined without the need to employ an inner calibration source.

In comparison with known designs the results of activity determinations, burdened with lower error, are obtainable by a simpler method.

BRIEF DESCRIPTION OF THE DRAWING

In the drawing the sole FIGURE thereof is a schematic view of a system for absolute activity determination, in an exemplary embodiment according to the invention.

DETAILED DESCRIPTION

The system is provided with a scintillation head G including three photomultipliers A, B, C optically coupled with a scintillator Sc and with the source Z which is the subject of determination. The outputs of the photomultipliers A, B, C are connected via amplifiers $W_A$, $W_B$, $W_C$ to four coincidence gates $K_{AB}$, $K_{BC}$, $K_{CA}$, $K_{ABC}$. The outputs of the double coincidence gates $K_{AB}$, $K_{BC}$, $K_{CA}$ are connected to a summing circuit S, the output $S_{K2}$ of which constitutes the first output of the system, the output $K_3$ of the triple coincidence gate $K_{ABC}$ constitutes the second output of the system.

The operation of the system according to the invention as well as an exemplary application of the method according to the invention is as specified hereinbelow.

In the scintillation head G, the scintillator Sc with the source Z to be determined is placed. The pulses from the photomultipliers A, B, C, amplified by the amplifiers $W_A$, $W_B$, $W_C$ are supplied to the coincidence (AND) gates $K_{AB}$, $K_{BC}$, $K_{CA}$, $K_{ABC}$. The coincidence pulses from the double coincidence gates $K_{AB}$, $K_{BC}$, $K_{CA}$ are summed in the summing circuit S. The coincident pulses are obtained simultaneously from two outputs $S_{K2}$, and $K_3$ of the system, and counted in two counters (not shown in the drawing). The absolute activity of the source Z being determined is a function of both counted numbers.

The counting efficiency decreases as the efficiency of conversion of the energy given up by beta particles in the scintillator into the photons of scintillation light decreases. The counting efficiency of the triple coincidencies decreases more rapidly than that of the double coincidencies, and that in turn more rapidly than the counting efficiency of a single photomultiplier.

The result of each determination, not as in known double systems, comprises two counted numbers $N_3$ and $N_2$ from the outputs $K_3$ and $S_{K2}$.

The ratio of said two numbers $$K=N_3/N_2$$

wherein:

$N_3$ is the number of triple coincidence pulses, $N_2$ is the number of double coincidence pulses, is used for determination of the counting efficiency.

On the ground of empirical data it can be stated that K may be regarded as the approximation of the counting efficiency $W_2$.

$$K \approx W_2 = N_2/N_0$$

wherein:

$N_0$ is the number of disintegrations in the source.

It results therefrom that $$N_0 \approx A = N_2/K = N_2^2/N_3$$

wherein:

A is an approximation of the source activity.

On performing a series of measurements on the source, with the quenching varied each time, a series of numbers $N_{31}$, $N_{21}$ is obtained, and thus the series $A_1$, $K_1$.

Said set of numbers represents a function $$A = f/K/$$

and if $$K \rightarrow 1$$

then $$A \rightarrow N_0$$

After extrapolation of the function $A = f/K/$ to $K = 1$ the value of the actual activity $N_0$ of the source is obtained.

Within the practical range of extrapolation the function $A = f/K/$ is linear.

What is claimed is:

1. A method for the absolute activity determination of radionuclides comprising producing pulses from three photomultipliers optically coupled to a scintillator and to a radionuclide source to be measured, producing further pulses representing multiples of coincidence of the first said pulses and correlating the counts obtained from the further pulses of the various multiples of coincidence to obtain a measure of the absolute activity of the radionuclide source.

2. A method as claimed in claim 1 wherein the multiples of coincidence are based on the coincidences of pairs of pulses from the photomultipliers and of the coincidence of all three pulses from the photomultipliers.

3. A method as claimed in claim 2 comprising adding the coincidences of the pairs of pulses from the photomultipliers and correlating the same with the coincidence of all three pulses from the photomultipliers to determine the measure of the absolute activity of the radionuclide source.

4. Apparatus for the determination of absolute activity of a radionuclide source, said apparatus comprising a scintillation head containing the radionuclide source whose activity is to be determined, a scintillator in said head, three photomultipliers optically coupled with said scintillation head for producing respective pulses, and gate means coupled to said photomultipliers for producing first and second output pulses corresponding to various multiples of coincident pulses from the photomultipliers.

5. Apparatus as claimed in claim 4 wherein said gate means includes AND gates having two inputs connected to respective pairs of photomultipliers and an AND gate with three inputs connected to the outputs of the three photomultipliers.

6. Apparatus as claimed in claim 5 comprising a summator connected to the outputs of the three AND gates with the two inputs.

7. Apparatus as claimed in claim 6 comprising amplifiers connected between the outputs of the photomultipliers and the gates.

* * * * *